US012699610B2

(12) United States Patent (10) Patent No.: US 12,699,610 B2
Soldner et al. (45) Date of Patent: Aug. 4, 2026

(54) MAINTENANCE SYSTEM AND METHOD OF ANALYZING AND/OR CREATING HEALTH INFORMATION FOR A HARDWARE SYSTEM

(71) Applicant: Rohde & Schwarz GmbH & Co. KG, Munich (DE)

(72) Inventors: Christian Soldner, Munich (DE); Philipp Joppich, Munich (DE); Daniel Markert, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 118 days.

(21) Appl. No.: 18/361,312

(22) Filed: Jul. 28, 2023

(65) Prior Publication Data
US 2025/0036499 A1 Jan. 30, 2025

(51) Int. Cl.
*G06F 11/00* (2006.01)

(52) U.S. Cl.
CPC .......... *G06F 11/008* (2013.01); *G06F 11/004* (2013.01)

(58) Field of Classification Search
CPC ............................. G06F 11/008; G06F 11/004
See application file for complete search history.

(56) References Cited

U.S. PATENT DOCUMENTS

| 10,284,025 | B2 | 5/2019 | Zeine et al. | |
| 2004/0133395 | A1* | 7/2004 | Ding ..................... | H04L 67/535 |
| | | | | 702/182 |

| 2008/0140362 | A1* | 6/2008 | Gross .................... | G06F 11/008 |
| | | | | 703/2 |
| 2016/0155315 | A1* | 6/2016 | McElhinney ........ | G05B 23/024 |
| | | | | 340/502 |
| 2019/0138964 | A1* | 5/2019 | Morita ............. | G06Q 10/06315 |
| 2019/0286725 | A1* | 9/2019 | Gawlick ............. | G06F 16/2264 |
| 2019/0384257 | A1* | 12/2019 | Zhang ................... | G06F 11/008 |
| 2020/0133753 | A1* | 4/2020 | Olson ................ | G06F 11/0781 |
| 2021/0124342 | A1* | 4/2021 | Shukla ............... | G05B 23/0283 |
| 2022/0101270 | A1* | 3/2022 | Tenneti .............. | G06F 11/0751 |
| 2022/0114045 | A1* | 4/2022 | Koehler ............. | G06F 11/0793 |
| 2023/0161653 | A1* | 5/2023 | Kim ...................... | G06N 3/047 |
| | | | | 714/1 |
| 2023/0205674 | A1* | 6/2023 | Sahu ..................... | G06N 20/00 |
| | | | | 717/125 |
| 2023/0342258 | A1* | 10/2023 | Sethi ...................... | G06F 16/27 |
| 2023/0376398 | A1* | 11/2023 | Kartikeya ............. | G06N 3/088 |

* cited by examiner

*Primary Examiner* — Philip Guyton

(74) *Attorney, Agent, or Firm* — CHRISTENSEN O'CONNOR JOHNSON KINDNESS PLLC

(57) ABSTRACT

A maintenance system for maintaining a hardware system is described. The maintenance system includes an acquisition circuit and an analysis circuit. The acquisition circuit can be configured to acquire a plurality of operational parameters of the hardware system, the plurality of operational parameters being relevant to a health state of the hardware system. The acquisition circuit can be configured to forward the plurality of operational parameters to the analysis circuit. The analysis circuit can be configured to determine a device health score for the hardware system, a remaining useful life of the hardware system, and/or a user recommendation for operating the hardware system, each based on the plurality of operational parameters. Further, a method of analyzing and/or creating health information for a hardware system is described.

15 Claims, 2 Drawing Sheets

MAINTENANCE SYSTEM AND METHOD OF ANALYZING AND/OR CREATING HEALTH INFORMATION FOR A HARDWARE SYSTEM

FIELD OF THE DISCLOSURE

Embodiments of the present disclosure generally relate to a maintenance system for maintaining a hardware system. Embodiments of the present disclosure further provide a method of analyzing and/or creating health information for a hardware system.

BACKGROUND

In general, it is desirable to avoid unexpected failures of measurement equipment that is used in order to test a device under test.

Usually, such unexpected failures of measurement equipment are avoided by periodically scheduled preventive maintenance of the measurement equipment that is performed by the manufacturer.

There are a plurality of different factors that determine the frequency of maintenances that are necessary to prevent unexpected failures of the measurement equipment.

Further, the measurement equipment may already be operating outside of ideal operational parameters even when the measurement equipment has not failed yet.

Thus, there is a need for a maintenance system for maintaining a hardware system as well as for a method of analyzing and/or creating health information for a hardware system that allow for an optimized maintenance of the hardware system.

SUMMARY

Embodiments of the present disclosure provide a maintenance system for maintaining a hardware system. The maintenance system comprises an acquisition circuit and an analysis circuit. The acquisition circuit is configured to acquire a plurality of operational parameters of the hardware system, the plurality of operational parameters being relevant to a health state of the hardware system. The acquisition circuit is configured to forward the plurality of operational parameters to the analysis circuit. The analysis circuit is configured to determine a device health score for the hardware system, a remaining useful life of the hardware system, and/or a user recommendation for operating the hardware system based on the plurality of operational parameters.

Therein and in the following, the term "operational" parameters is understood to denote parameters that relate to internal settings of the hardware system, to properties of signals processed within the hardware system, to currents flowing in the hardware system, and/or to voltages within the hardware system. Further, the term "operational parameters" may relate to properties of the hardware system itself and/or to properties of an environment of the hardware system.

The maintenance system according to the present disclosure is configured to assist a user in maintaining the hardware system in one or more ways. In general, the maintenance system according to the present disclosure allows for monitoring the hardware system and performing appropriate maintenance on the hardware system when necessary.

The maintenance system or rather the analysis circuit may determine the device health score (DHS) based on the plurality of operational parameters.

In general, the DHS is indicative of a health state of the hardware system, for example an overall health state of the hardware system or of individual subsystems of the hardware system.

The DHS may be a number within in a predetermined range, e.g. a number between 0 and 100. Therein a lower number may indicate a lower health state of the hardware system than a higher number.

Thus, the DHS corresponds to a continuous scale indicating the health state of the hardware system. Thus, more information on the health state is provided to the user than just "test passed" or "test failed". This allows for noticing drifts from optimal operating conditions early, i.e. before the hardware system actually has a critical health state.

As another example, the DHS may be a quantity corresponding to two or more different categories. For example, the DHS may be a color or a text message corresponding to these categories.

In a particular example, the DHS may be a first color, e.g. green, corresponding to the category "good health", a second color, e.g. yellow, corresponding to the category "suboptimal health", and a third color, e.g. red, corresponding to the category "bad health—maintenance necessary".

As another example, the DHS may be a text message, e.g. "send your device to service" or "measurements might be outside specification limits".

Accordingly, an easy to understand measure for the health state of the hardware system is provided by the maintenance system according to the present disclosure.

In other words, instead of having to analyze possibly complicated interrelations and/or interdependencies of the operational parameters of the hardware system and their impact on the health status, the user can easily assess the health status of the hardware system based on a single quantity, namely the DHS.

Alternatively or additionally, the maintenance system or rather the analysis circuit may determine the remaining useful life (RUL) based on the plurality of operational parameters.

The RUL may be indicative of the remaining time the hardware system can be used without encountering a failure. Alternatively or additionally, the RUL may be indicative of a remaining time the hardware system can be used within optimal operational parameters.

Accordingly, the RUL indicates the time span until the next maintenance has to be performed on the hardware system. Thus, instead of having to perform maintenance according to a fixed, predefined schedule, the maintenance system according to the present disclosure allows for performing maintenance only if it is indeed necessary, which reduces both the probability of unexpected failures of the hardware system and unnecessary downtimes of the hardware system. Accordingly, a better plannable availability of the hardware system is provided.

The RUL is an easy to understand measure for the time until the next maintenance has to be performed.

In other words, instead of having to analyze possibly complicated interrelations and/or interdependencies of the operational parameters of the hardware system and their impact on the necessity of maintenance, the user can easily assess the time until the next maintenance based on a single quantity, namely the RUL.

Failures of the hardware system are predicted before they actually occur, such that unexpected downtimes of the hardware system are avoided reliably.

Alternatively or additionally, the maintenance system or rather the analysis circuit may determine the user recommendation for operating the hardware system.

In general, the user recommendation may relate to operational parameters of the hardware system that should be set in order to improve the DHS and/or in order to extend the RUL. Accordingly, the user recommendation makes the user aware of fields of usage that reduce the RUL of the hardware system.

For example, if a user operates the hardware system outside of recommended operating ranges, e.g. regarding temperatures or loads on the hardware system, the user recommendation may comprise information on the recommended operating ranges and/or steps necessary to set the operational parameters to the recommended operating ranges.

As another example, if a user operates the hardware system outside of recommended wear metrics, for example regarding instrument uptime, number of relay cycle switches, etc., the user recommendation may comprise information on the recommended wear metrics and/or steps necessary to adhere to the recommended wear metrics.

According to an aspect of the present disclosure, the analysis circuit is configured to analyze the operational parameters, thereby obtaining rules for determining the device health score, the remaining useful life, and/or the user recommendation, wherein the analysis circuit is configured to extrapolate the obtained rules to unknown data sets of operational parameters. Thus, based on the obtained rules, the DHS, RUL, and/or user recommendation can reliably be determined for arbitrary sets of operational parameters.

In an embodiment of the present disclosure, the operational parameters used for obtaining the rules correspond to at least one known hardware system having a known health state. This way, the rules can be obtained with high precision, as the operational parameters are linked to a known health state.

In some embodiments, the operational parameters used for obtaining the rules correspond to several 10, several 100 or even several 1000 hardware systems having a known health state, respectively.

For example, the at least one known hardware system may have a perfect health state, a diminished health state, or a known defect.

As another example, the hardware system may perform a self-test and/or an internal adjustment in order to determine the health state. The derived rules may link the operational parameters to passing or failing the self-test.

The operational parameters used for obtaining the rules may correspond to a plurality of (known) hardware systems having a known health state, respectively.

According to a further aspect of the present disclosure, the analysis circuit comprises a machine-learning circuit, the machine-learning circuit comprising a machine-learning model that is pre-trained and/or trainable to determine the device health score, the remaining useful life, and/or the user recommendation based on the operational parameters. Accordingly, the operational parameters are input parameters of the machine-learning model. The DHS, the RUL, and/or the user recommendation are an output of the machine-learning model.

The machine-learning circuit may employ any suitable machine-learning technique. For example, the machine-learning model may be (pre-) trained based on training data that comprises operational parameters of at least one hardware system, for example of a plurality of hardware systems, and/or a known health state.

In some embodiments, the machine-learning model may be implemented as an artificial neural network that is pre-trained and/or trainable to determine the device health score, the remaining useful life, and/or the user recommendation based on the operational parameters.

As another example, the machine-learning model may be implemented as a gradient boosted decision tree algorithm that is pre-trained and/or trainable to determine the device health score, the remaining useful life, and/or the user recommendation based on the operational parameters.

Another aspect of the present disclosure provides that the maintenance system further comprises a visualization circuit and a display being connected to the visualization circuit, wherein the visualization circuit is configured to generate visualization data, the visualization data comprising information on the device health score, the remaining useful life, and/or the user recommendation, and wherein the display is configured to display the visualization data. Thus, the DHS, the RUL and/or the user recommendation are visualized such that the user can easily assess the health state of the hardware system, the time span until maintenance is necessary, and/or necessary steps in order to prolong the lifetime of the hardware system.

Accordingly, the user is warned if hardware system reaches a questionable or critical health state.

In some embodiments, the respective DHS, the respective RUL and/or the respective user recommendation relating to a plurality of hardware systems (also called a "fleet" of hardware systems) are visualized simultaneously. Thus, a user can easily monitor the health state of the plurality of hardware systems.

In some embodiments, the plurality of operational parameters comprise a time of use, a usage counter, operational voltages, a time spent in a particular operational mode, an internal correction parameter, an equalization parameter, a filter parameter, a frequency response of one or several components, a booting counter indicating how often a component is booting, an uptime, a predistortion parameter, time series information, a minimum data rate, a maximum data rate, and/or voltage thresholds.

As further examples, the plurality of operational parameters may comprise environmental parameters associated with an environment of the hardware system, such as temperature, humidity, and/or altitude.

Alternatively or additionally, the plurality of operational parameters may comprise dimensional and/or physical parameters, such as physical dimensions of the hardware system, a weight, etc.

Alternatively or additionally, the plurality of operational parameters may comprise regulatory standards that the hardware system is supposed to fulfill, e.g. laws or industrial norms.

Alternatively or additionally, the plurality of operational parameters may comprise time-related parameters, such as a time span since the last failure of the hardware system, a time span since the last maintenance has been performed on the hardware system, etc.

However, it is to be understood that the plurality of operational parameters may comprise any other suitable parameters.

According to an aspect of the present disclosure, the hardware system is configured to determine at least a subset of the plurality of operational parameters by a self-test and/or by an internal adjustment.

Therein and in the following, the term "self-test" is understood to denote measurements that are performed by the hardware system itself in order to assess whether certain operational parameters are within acceptable ranges.

For example, measured operational parameters may be compared to predefined thresholds in order to assess whether that operational parameters (and thus the hardware system) fail or pass the test.

The term "internal adjustment" is understood to denote that correction parameters are determined by the hardware system that are applied by the hardware system in order to obtain correct measurement results. For example, the correction parameters may relate to correcting temperature-induced drift, age-induced drift, and/or other inaccuracies.

It is also conceivable that the hardware system may be configured to determine the subset of the plurality of operational parameters by a dedicated time-series tracking.

In an embodiment of the present disclosure, the maintenance system is configured to perform measurements on the hardware system, thereby obtaining at least a subset of the plurality of operational parameters. In other words, measurements may be performed on the hardware system by external measurement equipment, i.e. by measurement equipment that is provided separately from the hardware system, in order to obtain the subset of the plurality of operational parameters. This way, operational parameters of the hardware system can be determined that may not be accessible via a self-test or via an internal adjustment.

For example, the measurements may be performed during maintenance of the hardware system at a manufacturer site. However, it is also conceivable that the measurements are performed by the user, i.e. by the customer.

A further aspect of the present disclosure provides that the analysis circuit is configured to determine specific measurements to be performed based on the device health score and/or based on the remaining useful life. In other words, the analysis circuit may be configured to select only those tests to be performed on the hardware system during maintenance that are actually necessary. This way, the time necessary for performing the maintenance can be reduced significantly.

In some embodiments, the analysis circuit is configured to determine the device health score for the hardware system, the remaining useful life of the hardware system, and/or the user recommendation for operating the hardware system based on measurement results obtained by the measurements. For example, the measurement results may be used in order to improve the accuracy of the rules determined as explained above. As another example, the machine-learning model described above may be trained based on the measurement results.

According to another aspect of the present disclosure, the analysis circuit is configured to determine a device health score for a hardware subsystem of the hardware system, a remaining useful life of a subsystem of the hardware system, and/or a user recommendation for operating a subsystem of the hardware system based on the plurality of operational parameters. Thus, the user is enabled to easily monitor individual components and/or devices of the hardware system. This allows for purposeful maintenance of the hardware system, for example for specific tests and/or replacements of individual components and/or devices of the hardware system.

In some embodiments, the analysis circuit is configured to determine a respective DHS, a respective RUL, and/or a respective user recommendation for a plurality of subsystems of the hardware system.

In other words, the analysis circuit is configured to perform a root cause analysis by determining which subsystem(s) actually cause a deterioration of the health state of the hardware system. This allows for purposefully replacing only the subsystem(s) that actually needs to be replaced, which also leads to faster maintenances and thus reduced downtime of the hardware system. Further, the maintenance of the hardware system can be performed in a more cost-efficient manner and with a reduced environmental impact.

The analysis circuit may be configured to schedule at least one of maintenance, a replacement hardware subsystem, or a replacement hardware system based on the determined device health score of the hardware system and/or based on the determined remaining useful life of the hardware system. Thus, an optimal time for performing the maintenance may be automatically determined by the analysis circuit. Alternatively or additionally, the analysis circuit may be configured to automatically order the replacement hardware subsystem or the replacement hardware system for the time of the scheduled maintenance, such that the user experiences no down-time for performing measurements by the hardware system.

In an embodiment of the present disclosure, the analysis circuit is configured to determine a confidence score associated with the device health score, the remaining useful life, and/or the user recommendation, wherein the confidence score is indicative of a reliability of the device health score, the remaining useful life, and/or the user recommendation determined. Thus, an easy to understand measure for the reliability of the obtained DHS, RUL, and/or user recommendation is provided to the user.

For example, the confidence score may be a number between 0% (indicating a minimum reliability) and 100% (indicating a maximum reliability).

The confidence score may be visualized on the display together with the DHS, the RUL, and/or the user recommendation.

The maintenance system may further comprise a communication circuit, wherein the communication circuit is configured to exchange data between the maintenance system and the hardware system, and wherein the exchanged data comprises service information and/or test information obtained by the hardware system. For example, the service information and/or test information may be used in order to enhance the accuracy of the rules determined as explained above. As another example, the machine-learning model described above may be trained based on the service information and/or test information.

The user of the hardware system may choose which data they want to share with the maintenance system.

Therein and in the following, the term "service" information is understood to denote information relating to a maintenance service cycle. For example, the service information may comprise a date of the last maintenance(s), a preliminary date for the next maintenance, etc.

The term "test information" is understood to denote information relating to measurements conducted by the hardware system. For example, the test information may comprise test results of a self-test, results of an internal adjustment, and/or measurement results of measurements conducted by the hardware system on a device under test.

In an embodiment of the present disclosure the hardware system is established as a measurement instrument or as a plurality of measurement instruments. In other words, the hardware system may be a measurement system that is configured to perform measurements on a device under test.

For example, the hardware system may be established as or comprise an oscilloscope, for example a digital oscilloscope, a spectrum analyzer, a power analyzer, a vector network analyzer, an RF frontend, an external RF frontend, a signal generator, a radar target simulator, a LiDAR target simulator, an over-the-air (OTA) test system, a beamforming antenna, a mobile communication cell simulator, etc.

The hardware system may further comprise electrical connectors, cables, signal splitters, signal combiners, directional couplers, etc.

Embodiments of the present disclosure further provide a method of analyzing and/or creating health information for a hardware system. The method comprises the steps of acquiring, by an acquisition circuit, a plurality of operational parameters of the hardware system, the plurality of operational parameters being relevant to a health state of the hardware system, forwarding the plurality of operational parameters to an analysis circuit, and determining, by the analysis circuit, a device health score for the hardware system, a remaining useful life of the hardware system, and/or a user recommendation for operating the hardware system based on the plurality of operational parameters.

In some embodiments, the maintenance system described above may be configured to perform the method of analyzing and/or creating health information.

Regarding the further advantages and properties of the method, reference is made to the explanations given above with respect to the maintenance system, which also hold for the method and vice versa.

According to an aspect of the present disclosure, the device health score, the remaining useful life, and/or the user recommendation are/is determined according to predefined rules based on a deterministic algorithm. Based on the predefined rules or rather based on the deterministic algorithm, the DHS, RUL, and/or user recommendation can reliably be determined for arbitrary sets of operational parameters, e.g. by extrapolating the rules to unknown data sets of operational parameters.

In an embodiment of the present disclosure, wherein the device health score, the remaining useful life, and/or the user recommendation are/is determined by a machine-learning technique. The DHS, RUL and/or user recommendation may be determined by a machine-learning circuit comprising a machine-learning model that is pre-trained and/or trainable to determine the DHS, RUL and/or user recommendation based on the operational parameters, as described above.

Measurements may be performed on the hardware system, thereby obtaining at least a subset of the plurality of operational parameters. In other words, measurements may be performed on the hardware system by external measurement equipment, i.e. by measurement equipment that is provided separately from the hardware system, in order to obtain the subset of the plurality of operational parameters. This way, operational parameters of the hardware system can be determined that may not be accessible via a self-test or via an internal adjustment.

According to another aspect of the present disclosure, at least a subset of the plurality of operational parameters is determined by the hardware system by a self-test and/or by an internal adjustment.

This summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
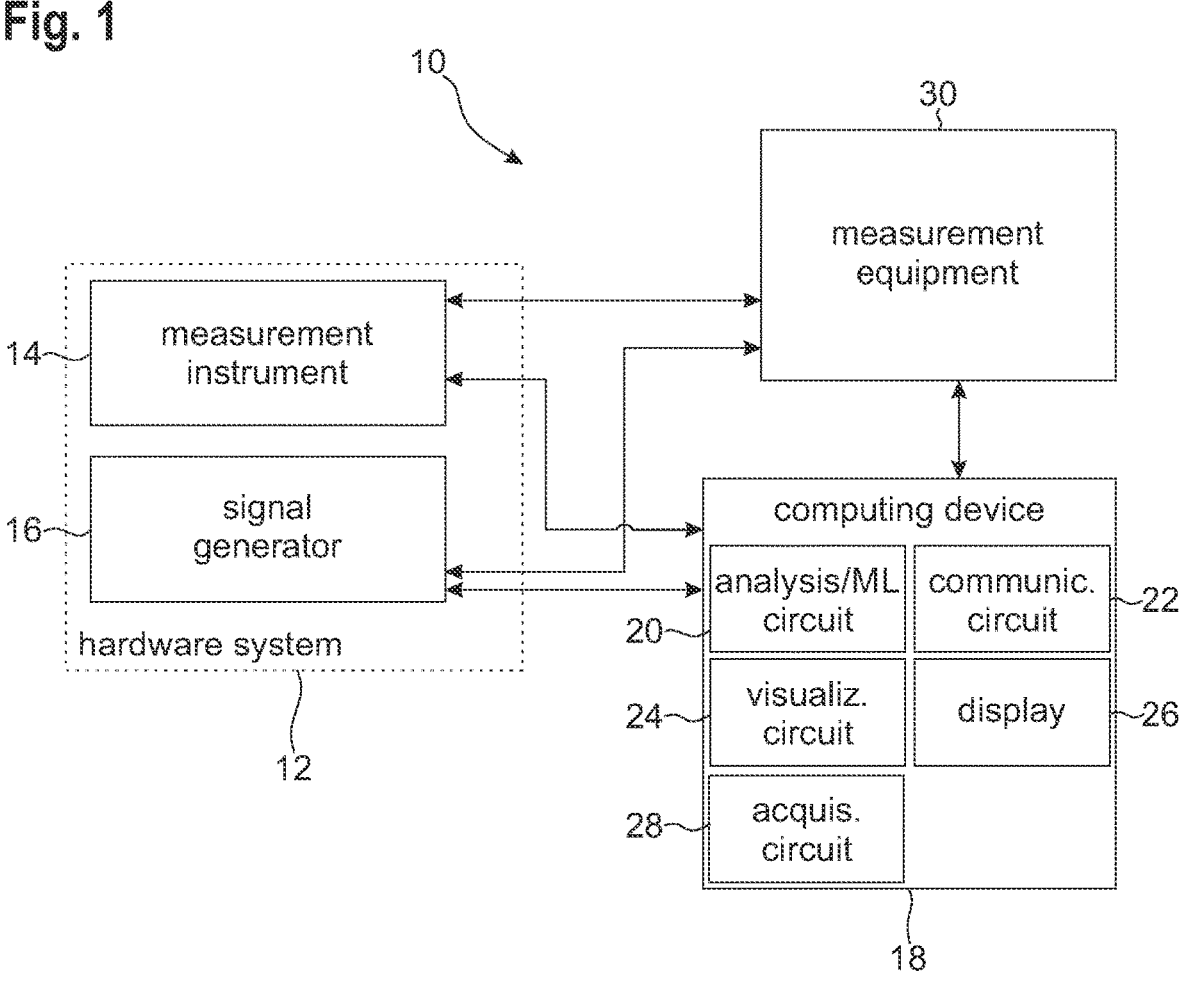
FIG. 1 schematically shows a maintenance system according to the present disclosure.

FIG. 1 schematically shows a maintenance system 10 for maintaining a hardware system 12.

In general, the maintenance system 10 is configured to analyze and/or create health information for the hardware system 12.

In the exemplary embodiment shown in FIG. 1, the hardware system 12 is a measurement system that is configured to perform measurements on a device under test.

For example, the hardware system 12 may be established as or comprise an oscilloscope, for example a digital oscilloscope, a spectrum analyzer, a power analyzer, a vector network analyzer, an RF frontend, an external RF frontend, a signal generator, a radar target simulator, a LiDAR target simulator, an over-the-air (OTA) test system, a beamforming antenna, a mobile communication cell simulator, etc.

The hardware system 12 may further comprise electrical connectors, cables, signal splitters, signal combiners, directional couplers, etc.

In the exemplary embodiment shown in FIG. 1, the hardware system 12 comprises a measurement instrument 14 and a signal generator 16.

The maintenance system 10 comprises a computing device 18 that is connected to the hardware system 12 in a signal transmitting manner.

Therein and in the following, the term "connected in a signal transmitting manner" is understood to denote a cable-based or wireless connection that is configured to transmit signals between the respective devices or components.

For example, the computing device 18 may be connected to the hardware system via a local area network (LAN), a wide area network, wireless LAN, the internet, or via any other suitable type of connection.

In the exemplary embodiment shown in FIG. 1, the computing device 18 is connected to both the measurement instrument 14 and the signal generator 16 in a signal transmitting manner.

For example, the computing device 18 may be established as a personal computer or as a server.

As another example, the computing device 18 may be established as a laptop, a tablet, a smartphone, or as any other type of smart device.

The computing device 18 comprises an analysis circuit 20 that may comprise a machine-learning (ML) circuit.

The computing device 18 further comprises a communication circuit 22, wherein the communication circuit is configured to exchange data between the maintenance system 10 and the hardware system 12.

The computing device 18 further comprises a visualization circuit 24, a display 26, and an acquisition circuit 28.

It is noted that while the analysis circuit 20, the communication circuit 22, the visualization circuit 24, the display 26, and the acquisition circuit 28 are shown to be integrated into a single computing device 18, these circuits may also be distributed over a plurality of computing devices that are interconnected with each other.

Further, it is also conceivable that the analysis circuit 20, the communication circuit 22, the visualization circuit 24, the display 26, and/or the acquisition circuit 28 are integrated into the hardware system 12, for example in the measurement instrument 14 and/or in the signal generator 16.

The functionality of the analysis circuit 20, of the communication circuit 22, of the visualization circuit 24, of the display 26, and of the acquisition circuit 28 will be described in more detail below.

Therein and in the following, the term "circuit" is understood to describe suitable hardware, or a combination of hardware and software that is configured to have a certain functionality.

The hardware may, inter alia, comprise a CPU, a GPU, an FPGA, an ASIC, or other types of electronic circuitry.

The maintenance system 10 may further comprise measurement equipment 30.

In general, the measurement equipment 30 is configured to perform measurements on the hardware system 12, as will be described in more detail below.

In some embodiments, the measurement equipment 30 comprises suitable measurement instruments, electrical connectors, cables, signal splitters, signal combiners, directional couplers, etc., such that measurements can be performed on the hardware system 12.

In the exemplary embodiment shown in FIG. 1, the measurement equipment 30 is configured to perform measurements on the measurement instrument 14 and on the signal generator 16.

Figure 2:
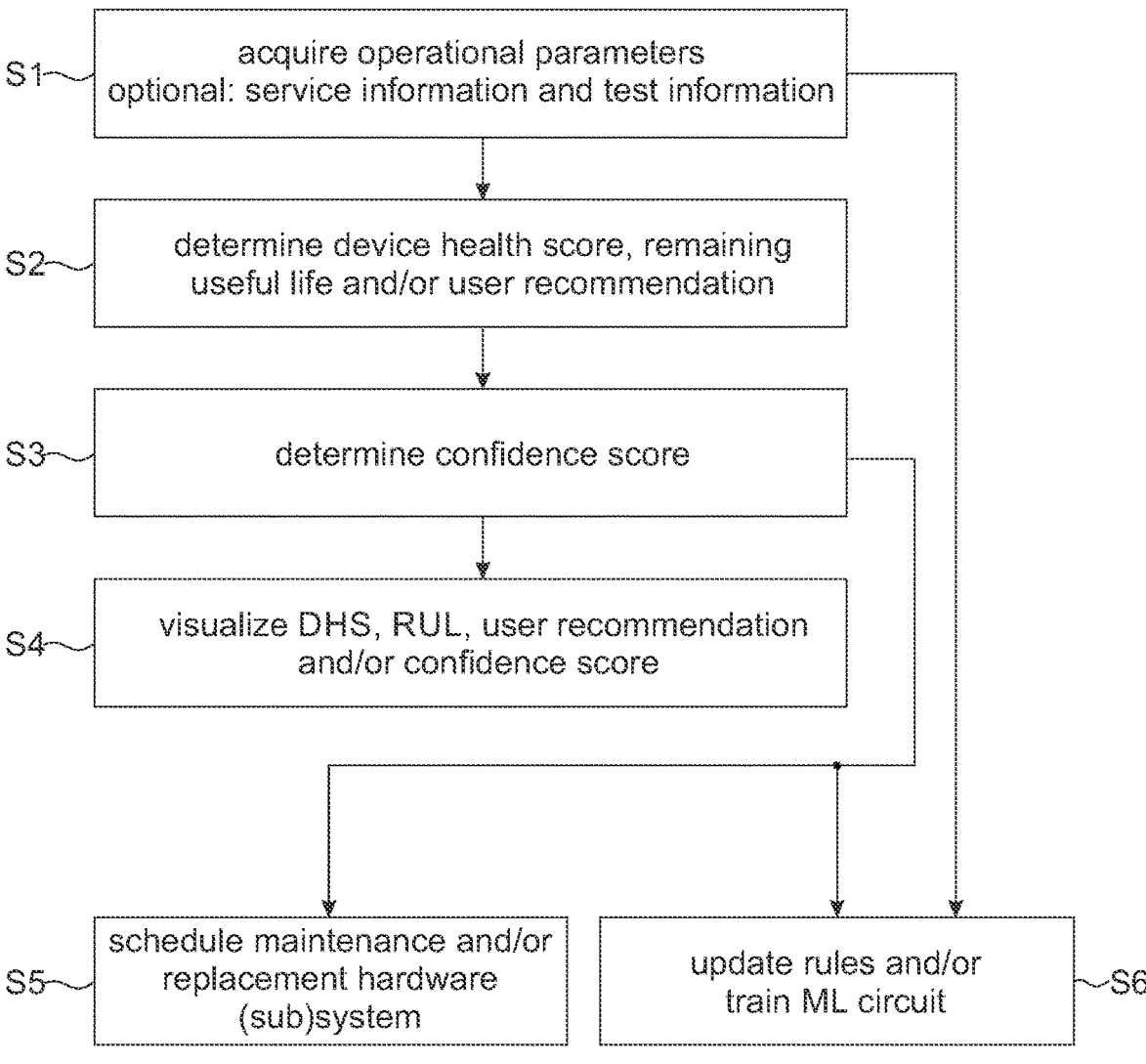
FIG. 2 shows a flow chart of a method of analyzing and/or creating health information for a hardware system according to the present disclosure.

The maintenance system 10 is configured to perform a method of analyzing and/or creating health information for the hardware system 12. The method is described in the following with reference to FIG. 2.

A plurality of operational parameters of the hardware system 12 is acquired by the acquisition circuit 28 (step S1).

In general, the acquired operational parameters are relevant to a health state of the hardware system 12.

The plurality of operational parameters may comprise a time of use, a usage counter, operational voltages, a time spent in a particular operational mode, an internal correction parameter, an equalization parameter, a filter parameter, a frequency response of one or several components, a booting counter indicating how often a component is booting, an uptime, a predistortion parameter, time series information, a minimum data rate, a maximum data rate, and/or voltage thresholds.

As further examples, the plurality of operational parameters may comprise environmental parameters associated with an environment of the hardware system, such as temperature, humidity, and/or altitude.

Alternatively or additionally, the plurality of operational parameters may comprise dimensional and/or physical parameters, such as physical dimensions of the hardware system, a weight, etc.

Alternatively or additionally, the plurality of operational parameters may comprise regulatory standards that the hardware system is supposed to fulfill, e.g. laws or industrial norms.

Alternatively or additionally, the plurality of operational parameters may comprise time-related parameters, such as a time span since the last failure of the hardware system, a time span since the last maintenance has been performed on the hardware system, etc.

However, it is to be understood that the plurality of operational parameters may comprise any other suitable parameters.

At least a subset of the plurality of operational parameters may be logged by the hardware system 12 during operation of the hardware system 12.

For example, the hardware system 12 may be configured to log the subset of the plurality of operational parameters in predefined intervals, for example every 24 hours, every twelve hours, or every four hours.

As another example, the hardware system 12 may be configured to log the subset of operational parameters based on the occurrence of certain events, for example if the hardware system 12 performs internal adjustments of its operational parameters.

In other words, the logging of the subset of operational parameters may be triggered by the corresponding events, in some embodiments based on an impact of the respective event on measurement capabilities of the hardware system 12.

The logged operational parameters may be transmitted to the acquisition circuit 28 via the communication circuit 22.

At least a subset of the plurality of operational parameters may be determined by the hardware system 12 by a self-test and/or by an internal adjustment.

For example, operational parameters measured by the hardware system 12 may be compared to predefined thresholds in order to assess whether that operational parameters (and thus the hardware system) fail or pass the test.

As another example, the hardware system 12 may determine correction parameters relate to correcting temperature-induced drift, age-induced drift, and/or other inaccuracies.

At least a subset of the plurality of operational parameters may be determined by performing measurements on the hardware system 12 by the measurement equipment 30.

In some embodiments, operational parameters of the hardware system 12 that cannot be determined by self-tests, internal adjustments or logging of operational parameters by the hardware system 12 may be measured by the measurement equipment 30.

It is also conceivable that operational parameters logged or measured by the hardware system 12 are forwarded to the analysis circuit 20. The analysis circuit 20 may determine specific measurements to be performed by the measurement equipment 30 based on these operational parameters.

Optionally, service information and/or test information may be acquired from the hardware system 12.

The plurality of operational parameters as well as the service information and/or the test information are forwarded to the analysis circuit 20.

The plurality of operational parameters are processed by the analysis circuit 20, thereby determining a device health score (DHS) for the hardware system 12, a remaining useful life (RUL) of the hardware system 12, and/or a user recommendation for operating the hardware system 12 (step S2).

Therein, the DHS, the RUL, and/or the user recommendation may be determined for the hardware system 12 as a whole. Alternatively or additionally, the DHS, the RUL, and/or the user recommendation may be determined for one or several hardware subsystems of the hardware system 12, i.e. for individual devices and/or for individual components.

In general, the DHS is indicative of a health state of the hardware system 12, for example an overall health state of the hardware system 12 or of individual subsystems of the hardware system 12.

The DHS may be a number within in a predetermined range, e.g. a number between 0 and 100. Therein a lower number may indicate a lower health state of the hardware system than a higher number.

The RUL may be indicative of the remaining time the hardware system 12 can be used without encountering a failure. Alternatively or additionally, the RUL may be indicative of a remaining time the hardware system 12 can be used within optimal operational parameters.

The user recommendation may relate to operational parameters of the hardware system 12 that should be set in order to improve the DHS and/or in order to extend the RUL.

For example, if a user operates the hardware system 12 outside of recommended operating ranges, e.g. regarding temperatures or loads on the hardware system, the user recommendation may comprise information on the recommended operating ranges and/or steps necessary to set the operational parameters to the recommended operating ranges.

As another example, if a user operates the hardware system 12 outside of recommended wear metrics, for example regarding instrument uptime, number of relay cycle switches, etc., the user recommendation may comprise information on the recommended wear metrics and/or steps necessary to adhere to the recommended wear metrics.

The analysis circuit 20 may process the plurality of operational parameters based on one or more of the techniques described in the following.

According to a first variant, the analysis circuit 20 may process the plurality of operational parameters according to predefined rules based on a deterministic algorithm. Therein, the term "predefined rules based on a deterministic algorithm" is understood to denote that a "classical" algorithm is used, i.e. an algorithm that does not employ machine-learning techniques.

If necessary, the predefined rules may be extrapolated such that the acquired plurality of operational parameters can be processed correctly.

According to a second variant, the analysis circuit 20 comprises a machine-learning (ML) circuit, wherein the machine-learning circuit comprising a machine-learning model, for example an artificial neural network or a tree-based algorithm, that is pre-trained and/or trainable to determine the DHS, the RUL, and/or the user recommendation based on the operational parameters.

For example, the artificial neural network may be a feed-forward neural network.

As another example, the tree-based algorithm may be a gradient boosted decision tree algorithm.

Therein, the plurality of operational parameters are input parameters of the machine-learning model. The DHS, the RUL, and/or the user recommendation are an output of the machine-learning model.

Optionally, a confidence score may be determined by the analysis circuit 20 (step S3).

In general, the confidence score is indicative of a reliability of the DHS, the RUL, and/or the user recommendation determined.

For example, the confidence score may be a number between 0% (indicating a minimum reliability) and 100% (indicating a maximum reliability).

Visualization data is generated by the visualization circuit 24 and the visualization data is visualized on the display 26 (step S4).

The visualization data comprises information on the DHS, the RUL, and/or the user recommendation determined.

Optionally, the visualization data may comprise information on the confidence score, such that the confidence score is visualized together with the DHS, the RUL, and/or the user recommendation determined.

Optionally, the analysis circuit 20 may automatically schedule at least one of maintenance, a replacement hardware subsystem, or a replacement hardware system based on the determined DHS and/or based on the determined RUL (step S5).

The predefined rules described above, i.e. the deterministic algorithm described above, may be updated or rather adapted (step S6).

In some embodiments, the predefined rules are adapted based on the determined DHS, the determined RUL and/or the determined confidence score.

Further, the predefined rules may be adapted based on the acquired operational parameters, in some embodiments based on measurement results obtained by the measurement equipment 30, results of a self-test, results of an internal adjustment, and/or logged operational parameters.

Likewise, the machine-learning model may be trained or rather re-trained based on the determined DHS, the determined RUL and/or the determined confidence score.

Moreover, the machine-learning model may be trained or rather re-trained based on the acquired operational parameters, in some embodiments based on measurement results obtained by the measurement equipment 30, results of a self-test, results of an internal adjustment, and/or logged operational parameters.

Accordingly, the way the analysis circuit 20 determines the DHS, the RUL and/or the user recommendation may be updated regularly, e.g. during a maintenance of the hardware system 12.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A maintenance system for maintaining a hardware system, wherein the hardware system is established as a measurement instrument or as a plurality of measurement instruments, the maintenance system comprising:

an acquisition circuit;

measurement equipment;

a visualization circuit;

a display being connected to the visualization circuit; and an analysis circuit, wherein the acquisition circuit is configured to acquire a plurality of operational parameters of the hardware system, the plurality of operational parameters being relevant to a health state of the hardware system, wherein the hardware system is configured to log a subset of the operational parameters or to perform a self-test to determine the subset of the plurality of operational parameters, wherein the hardware system is configured to transmit the subset of the operational parameters to the acquisition circuit, wherein the acquisition circuit is configured to forward the subset of the plurality of operational parameters to the analysis circuit, wherein the analysis circuit is configured to determine specific measurements to be performed by said measurement equipment, the analysis circuit being configured to determine said specific measurements based on the subset of the plurality of operational parameters, said specific measurements comprising only measurements being necessary for maintenance of the hardware system, wherein the measurement equipment is configured to perform said specific measurements on the hardware system, thereby obtaining a further subset of the plurality of operational parameters, wherein the acquisition circuit is configured to forward the further subset of the plurality of operational parameters to the analysis circuit, and wherein the analysis circuit is configured to determine, based on the plurality of operational parameters comprising the subset of the plurality of operational parameters and the further subset of the plurality of operational parameters:

a device health score for the hardware system;

a remaining useful life of the hardware system; and/or a user recommendation for operating the hardware system, wherein the analysis circuit is configured to determine the device health score for the hardware system, the remaining useful life of the hardware system, and/or the user recommendation for operating the hardware system based on measurement results obtained by the specific measurements performed by said measurement equipment, wherein the visualization circuit is configured to generate visualization data, the visualization data comprising information on the device health score, the remaining useful life, and/or the user recommendation, and wherein the display is configured to display the visualization data.

2. The maintenance system of claim 1, wherein the analysis circuit is configured to analyze the operational parameters, thereby obtaining rules for determining the device health score, the remaining useful life, and/or the user recommendation, and wherein the analysis circuit is configured to extrapolate the obtained rules to unknown data sets of operational parameters.

3. The maintenance system of claim 2, wherein the operational parameters used for obtaining the rules correspond to at least one known hardware system having a known health state.

4. The maintenance system of claim 1, wherein the analysis circuit comprises a machine-learning circuit, the machine-learning circuit comprising a machine-learning model that is pre-trained and/or trainable to determine the device health score, the remaining useful life, and/or the user recommendation based on the operational parameters.

5. The maintenance system of claim 1, wherein the plurality of operational parameters comprise a time of use, a usage counter, operational voltages, a time spent in a particular operational mode, an internal correction parameter, an equalization parameter, a filter parameter, a frequency response of one or several components, a booting counter indicating how often a component is booting, an uptime, a predistortion parameter, time series information, a minimum data rate, a maximum data rate, and/or voltage thresholds.

6. The maintenance system of claim 1, wherein the hardware system is configured to determine at least a subset of the plurality of operational parameters by a self-test and/or by an internal adjustment.

7. The maintenance system of claim 1, wherein the analysis circuit is configured to determine a device health score for a hardware subsystem of the hardware system, a remaining useful life of a subsystem of the hardware system, and/or a user recommendation for operating a subsystem of the hardware system based on the plurality of operational parameters.

8. The maintenance system of claim 1, wherein the analysis circuit is configured to schedule at least one of maintenance, a replacement hardware subsystem, or a replacement hardware system based on the determined device health score of the hardware system and/or based on the determined remaining useful life of the hardware system.

9. The maintenance system of claim 1, wherein the analysis circuit is configured to determine a confidence score associated with the device health score, the remaining useful life, and/or the user recommendation, wherein the confidence score is indicative of a reliability of the device health score, the remaining useful life, and/or the user recommendation determined.

10. The maintenance system of claim 1, further comprising a communication circuit, wherein the communication circuit is configured to exchange data between the maintenance system and the hardware system, and wherein the exchanged data comprises service information and/or test information obtained by the hardware system.

11. A method of analyzing and/or creating health information for a hardware system, wherein the hardware system is established as a measurement instrument or as a plurality of measurement instruments, the method comprising:

acquiring, by an acquisition circuit, a plurality of operational parameters of the hardware system, the plurality of operational parameters being relevant to a health state of the hardware system;

logging, by the hardware system, a subset of the operational parameters or performing, by the hardware system, a self-test to determine the subset of the plurality of operational parameters;

transmitting, by the hardware system, the subset of the operational parameters to the acquisition circuit, forwarding, by the acquisition circuit, the subset of the plurality of operational parameters to an analysis circuit, determining, by the analysis circuit, specific measurements to be performed by measurement equipment, wherein the analysis circuit determines said specific measurements based on the subset of the plurality of operational parameters, said specific measurements comprising only measurements being necessary for maintenance of the hardware system, performing, by said measurement equipment, said specific measurements on the hardware system, thereby obtaining a further subset of the plurality of operational parameters, forwarding the further subset of the plurality of operational parameters to the analysis circuit;

determining, by the analysis circuit, based on the plurality of operational parameters comprising the subset of the plurality of and the further subset of the plurality of operational parameters:

a device health score for the hardware system;

a remaining useful life of the hardware system; and/or a user recommendation for operating the hardware system, wherein the analysis circuit determines the device health score for the hardware system, the remaining useful life of the hardware system, and/or the user recommendation for operating the hardware system based on measurement results obtained by the specific measurements performed by said measurement equipment;

generating, by a visualization circuit, visualization data, the visualization data comprising information on the device health score, the remaining useful life, and/or the user recommendation; and displaying, by a display being connected to the visualization circuit, the visualization data.

12. The method of claim 11, wherein the device health score, the remaining useful life, and/or the user recommendation are/is determined according to predefined rules based on a deterministic algorithm.

13. The method of claim 11, wherein the device health score, the remaining useful life, and/or the user recommendation are/is determined by a machine-learning technique.

14. The method of claim 11, wherein at least a subset of the plurality of operational parameters is determined by the hardware system by a self-test and/or by an internal adjustment.

15. A maintenance system for maintaining a hardware system, wherein the hardware system is established as a measurement instrument or as a plurality of measurement instruments, the maintenance system comprising:

an acquisition circuit;

measurement equipment;

a visualization circuit;

a display being connected to the visualization circuit; and an analysis circuit, wherein the acquisition circuit is configured to acquire a plurality of operational parameters of the hardware system, the plurality of operational parameters being relevant to a health state of the hardware system, wherein the hardware system is configured to log a subset of the operational parameters and/or to perform a self-test to determine the subset of the plurality of operational parameters, wherein the hardware system is configured to transmit the subset of the operational parameters to the acquisition circuit, wherein the acquisition circuit is configured to forward the subset of the plurality of operational parameters to the analysis circuit, wherein the measurement equipment is configured to perform specific measurements on the hardware system, thereby obtaining a further subset of the plurality of operational parameters, wherein the acquisition circuit is configured to forward the further subset of the operational parameters to the analysis circuit, and wherein the analysis circuit is configured to determine, based on the plurality of operational parameters comprising the subset of the plurality of and the further subset of the plurality of operational parameters:

a device health score for the hardware system;

a remaining useful life of the hardware system; and/or a user recommendation for operating the hardware system, wherein the analysis circuit is configured to determine the device health score for the hardware system, the remaining useful life of the hardware system, and/or the user recommendation for operating the hardware system based on measurement results obtained by the specific measurements performed by said measurement equipment, wherein the visualization circuit is configured to generate visualization data, the visualization data comprising information on the device health score, the remaining useful life, and/or the user recommendation, and wherein the display is configured to display the visualization data.

* * * * *